United States Patent Office.

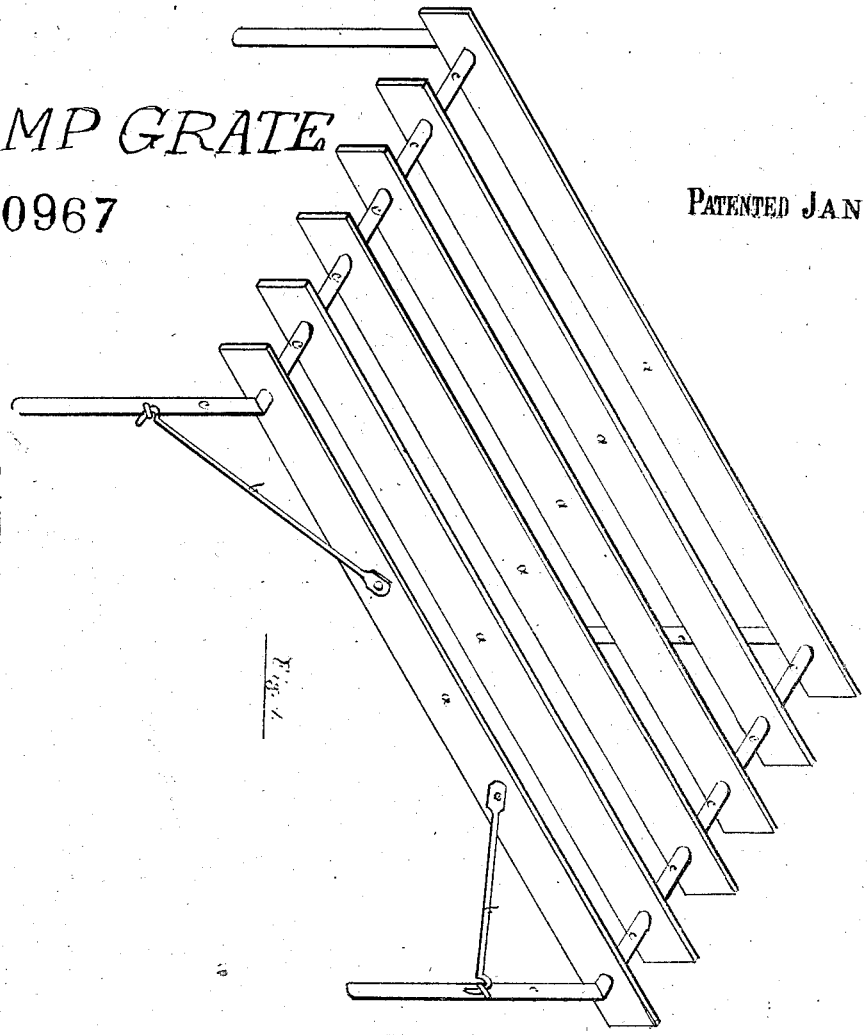
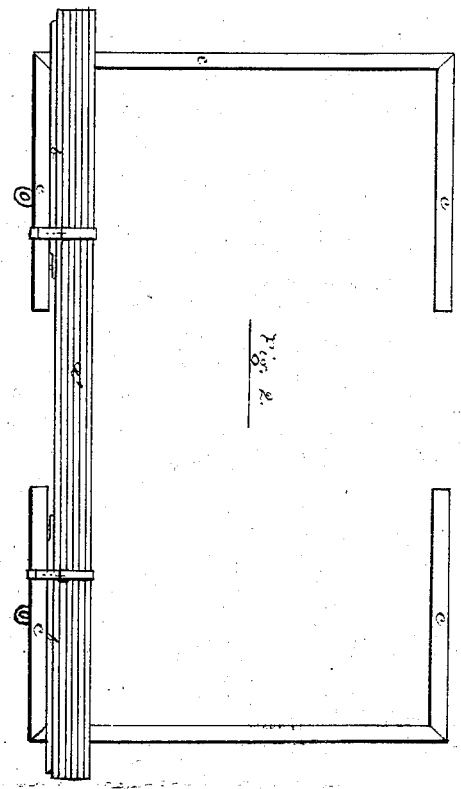

LORENZO D. GAVITT OF LOS ANGELES, CALIFORNIA.

Letters Patent No. 110,967, dated January 17, 1871; antedated January 7, 1871.

IMPROVEMENT IN PORTABLE CAMP-GRATES.

The Schedule referred to in these Letters Patent and making part of the same.

I, LORENZO D. GAVITT, of Los Angeles, in the county of Los Angeles and State of California, have invented a certain Portable Camp-Grate, of which the following is a specification.

Nature and Object.

The object of my portable camp-grate is to expedite and render pleasant the duties of cooking in camp.

Description.

It consists of six (more or less) movable horizontal bars, with a bar of round iron passing through each end, forming a rest. Each end of the round bar is bent down at right angles, forming legs. These legs are secured in a vertical position by means of a hook-brace.

Description of Drawing Accompanying Application.

Figure 1 represents the grate when set up for use, and

Figure 2 represents it when folded and ready for moving.

$a$ represents the movable bars;
$b$, the hook-brace; and
$c$, the legs and rest for bars.

Claim.

I claim as my invention—

The folding legs $c$ and hook-brace $b$, and the mode of securing the movable bars, and their application to the use and purpose herein set forth.

LORENZO D. GAVITT.

Witnesses:
SAM. PURDY, Jr.,
WARREN H. MACE.